Aug. 29, 1939.   S. R. SMITH   2,170,978
COASTING DEVICE
Filed Aug. 9, 1937   2 Sheets-Sheet 1
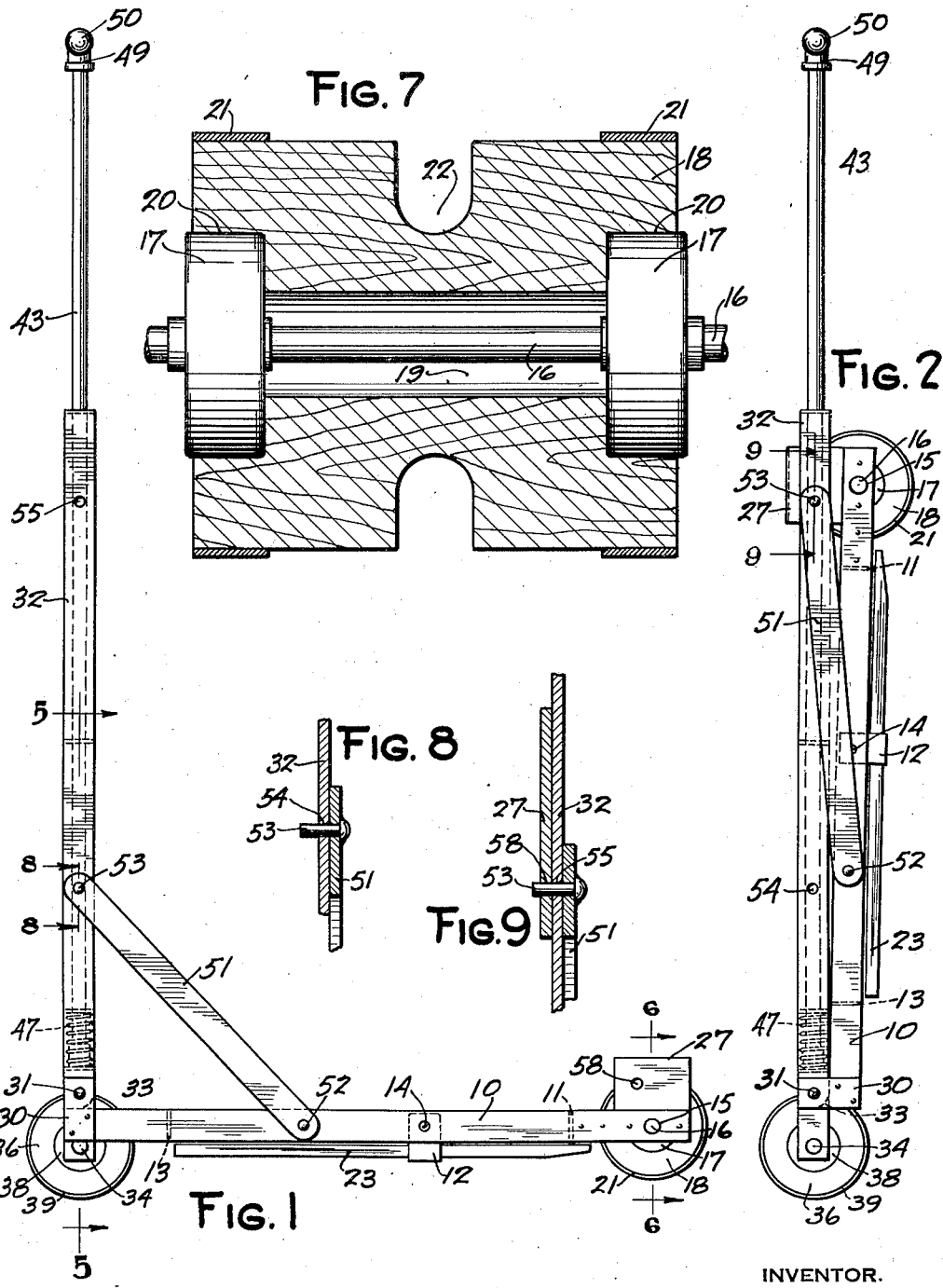
INVENTOR.
SAM R. SMITH.
ATTORNEY

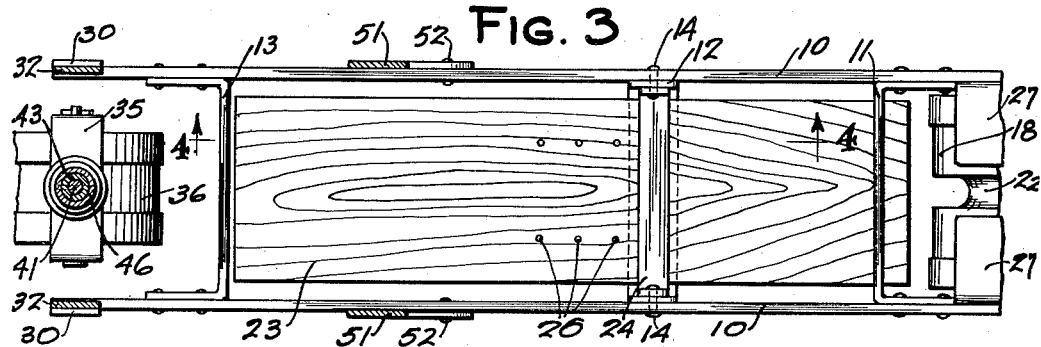
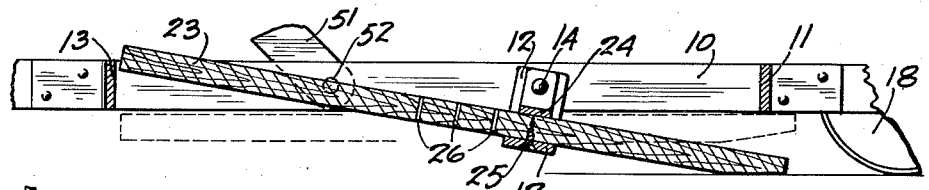
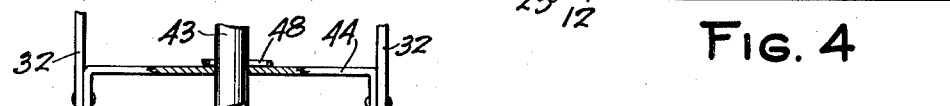
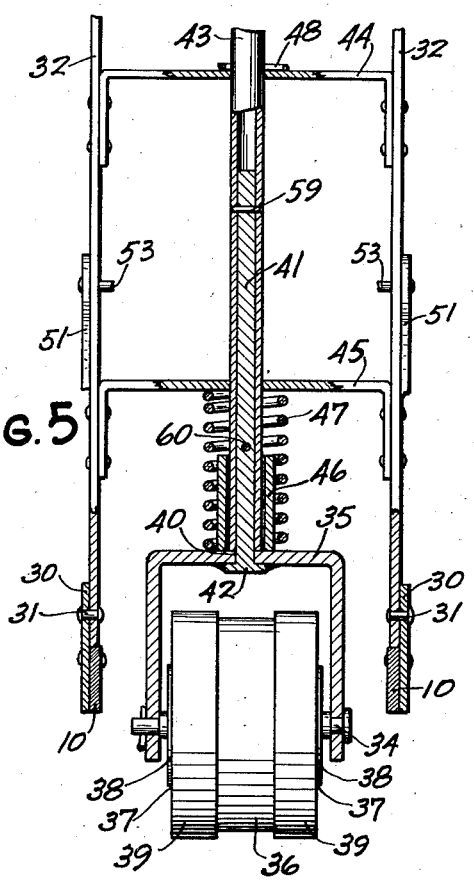
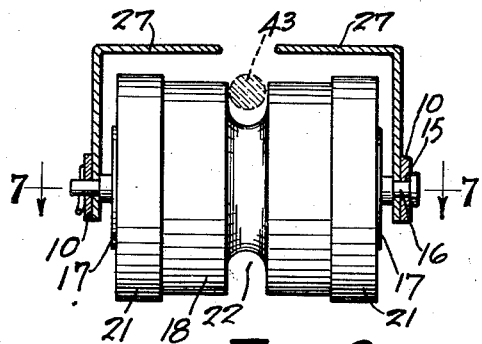

Patented Aug. 29, 1939

2,170,978

UNITED STATES PATENT OFFICE 2,170,978

COASTING DEVICE

Sam R. Smith, South Bend, Ind.

Application August 9, 1937, Serial No. 158,118

5 Claims. (Cl. 280—87.05)

This invention relates to coasting devices and refers particularly to such devices used especially by children in coasting on pavements or hard surfaced roads.

One of the primary objects of my invention is to provide an improved coaster, the parts of which are of simple and inexpensive construction and capable of easy and rigid assembly thereby providing a vehicle which can be manufactured and sold at a relatively low cost and which device is not only of neat and pleasing appearance but also is of rugged and sturdy construction so that it will successfully withstand the use and abuse to which such coasters are subjected by children.

Another object is to provide a coasting device which includes a tiltable platform on which the child may ride and which when tilted in a rearward direction to ground engaging position will act as a brake for the vehicle.

Another object is to provide a coaster used by children and adapted to be propelled by one foot of the child while the latter is standing with one foot on the platform of the vehicle and guiding the coaster by a suitable steering mechanism.

Another object is to provide a coaster which may be folded or collapsed when not in use and which may be trundled and guided by the steering wheel thereof.

Another object is to provide a coaster which has a resiliently supported steering wheel so that shocks, when traveling over rough surfaces, will be absorbed by a spring interposed between the frame and steering wheel.

Other objects, and objects relating to details of construction and methods of manufacture will be apparent from the drawings and detailed description to follow.

Referring to the drawings:

Fig. 1 is a side elevational view of the coaster incorporating my invention;

Fig. 2 is a view similar to Fig. 1 showing the coaster in folded position;

Fig. 3 is a top plan view of the coaster shown in Fig. 1 with the steering column shown in Fig. 1;

Fig. 4 is a longitudinal sectional view taken on the line 4—4 of Fig. 3 showing a fragmentary portion of the frame, the platform and the pivoted support therefor;

Fig. 5 is an enlarged detailed sectional view taken on the line 5—5 of Fig. 1 showing the steering wheel and support therefor;

Fig. 6 is a detailed sectional view of the rear wheels taken on the line 6—6 of Fig. 1;

Fig. 7 is an enlarged detailed sectional view of the rear wheels taken on the line 7—7 of Fig. 6;

Fig. 8 is a detailed sectional view taken on the line 8—8 of Fig. 1 showing a fragmentary portion of the support for the steering column and the brace therefor;

Fig. 9 is a view similar to Fig. 8 but showing the respective parts in the position illustrated in Fig. 2;

Heretofore a considerable number of coasters have been on the market all of which had disadvantages in that they were cumbersome for the child to handle, required excessive labor to operate, would not stand up when unsupported, could not be folded when not in use, or were too expensive to manufacture so that the cost was too high for such articles. I have overcome all of these disadvantages and in order that others may better understand my invention and the improvements which I have made in coasters, reference will be had to the accompanying drawings in which I have shown a frame comprising side members 10 and cross members 11, 12 and 13. The rear cross member 11 and the front cross member 13 may be riveted, welded or bolted to the side members 10 to form an integral part thereof while the cross member 12 is pivoted thereto by the pins 14 for a purpose to be hereinafter described.

At the rear of the coaster I provide suitable holes 15 in the side members 10 to receive a shaft 16 on which I preferably mount ball bearings 17 which may be wheels like that now used on roller skates; hence a detailed description of these bearings is not thought necessary. A wooden spool 18 having an opening 19 extending axially therethrough and having enlarged recesses 20 at opposite sides thereof is mounted on the bearings 17 as is best illustrated in Fig. 7. The central opening 19 is preferably packed with grease to lubricate the bearings 17 so that frequent oiling of the wheels is not necessary. On opposite sides of the spool 18 I mount wheel rims 21, preferably of steel; however, rubber or other material may be substituted, if so desired. I preferably provide rims 21 only at the outer edges of the spool 18, as illustrated in Fig. 6, so that in effect I provide two spaced wheels at the rear of the coaster so that the coaster will stand in upright position when not in use. I also provide a recess 22 in the spool 18 intermediate the rims 21 for a purpose to be hereinafter described.

Forwardly of the rear wheels I provide a platform 23 supported by the cross member 12 which is pivoted at 14 to the side frame members 10. I also preferably provide a reinforcing bracket 24, the flat portion of which rests on top of the platform 23 the ears thereof being carried by the pins 14. I preferably use a flat bracket 24 so that the same will not cause discomfort to the barefooted operator. The platform 23 is preferably of wood, the forward edge of which projects forwardly adjacent to the front cross member 13, and the rear edge of which extends rearwardly under the rear cross member 11. The child normally puts his foot on the platform with the weight of his body forwardly of the pivots 14 so that the platform will be in the position as shown in Fig. 1 with the rear end thereof abutting against the under edge of the rear cross member 11. When, however, the child desires to stop the coaster he may shift his weight to the heel so that the weight of his body will be at the rear of the pivots 14 whereupon the platform 23 will assume the position shown in Fig. 4 and the bottom of the platform adjacent to the rear edge will drag on the ground or pavement to stop the coaster. Of course the rapidity with which the coaster may be stopped will depend somewhat upon the pressure which the child applies to the platform at the rear of the pivots 14 therefor.

As I prefer to make the platform 23 out of wood, it will be apparent that the rear portion thereof will wear away after the same has been used a considerable number of times as a brake and I therefore provide screws 25 extending through the cross member 12 into the platform 23 which may be removed and the platform moved rearwardly to take up the wear, suitable holes 26 being previously drilled for that purpose.

Heretofore it has been the common practice for the child to put his foot on the rear wheel of the coaster to provide a brake thereby wearing a flat spot on the wheel or tire and to eliminate that possibility I provide guards 27 over the rear wheels as is best shown in Figs. 1 and 6. As illustrated, the guards 27 are L-shaped members having their sides riveted or otherwise suitably secured to the frame side members 10 and having their top portions extending over the wheels, as illustrated.

At the front of the frame members 10 I preferably provide upwardly extending brackets 30 rigidly secured thereto in which are pivotally supported by the pins 31, a U-shaped frame member 32 which supports the steering wheel assembly. As shown in Fig. 1, the free edges of the U-shaped member 32 are rounded at 33 to permit folding of the steering mechanism relative to the frame 10 on the pivots 31. The front or steering wheel assembly may be similar to the rear wheel assembly except that the same is not so wide and comprises a shaft 34 supported in a fork 35 and which extends through a spool 36 which is recessed at 37 on opposite sides thereof to receive roller bearings 38 which may be wheels now commonly used on roller skates. Although it is not illustrated, the opening through the spool 36 to receive the supporting shaft 34 may be of sufficient size, as illustrated in Fig. 7, to receive grease for lubricating the bearings 38. I also provide tires 39 on the spool 36, at the outer edges thereof as best shown in Fig. 5, for the same purpose as the tires heretofore described forming the rear wheels.

An opening 40 is provided in the fork 35 through which extends a pin 41, the head 42 of which is suitably welded or pressed to the fork 35. A steering column 43 which is preferably a tubular shaft extends through openings in the cross member of the U-shaped member 32 and through reinforcing members 44 and 45 and extends over the pin 41 and is secured thereto by the pins 59 and 60, or by any other suitable means. Immediately above the fork 35 and surrounding the steering column 43 I provide a collar 46 over which extends a coil spring 47 which extends between the cross member 45 and the fork 35. It will be apparent that the spring 47 provides a cushion or a resilient connection between the steering wheel and the frame of the coaster and that the collar 46 provides a stop for the downward movement of the frame of the coaster relative to the steering wheel in the event the same is overloaded or in the case of severe shocks. Also to prevent movement of the steering wheel and the form 35 from moving downwardly relative to the frame I provide a pin 48 extending through the steering column 43 immediately before the cross member 44. At the upper end of the steering column 43 I provide a coupling 49 from which extend oppositely extending handles 50 by which the coaster may be steered.

I have previously stated that the steering mechanism may be folded relative to the frame member 10 and to keep the same in upright position I provide braces 51 pivotally secured to the frame members 10 at 52 and having pins 53 extending through suitable openings 54 in the U-shaped frame member 32. When it is desired to fold the steering mechanism, the brace members 51 may be pulled outwardly so that the pins 53 thereon will disengage from the U-shaped member 32 whereupon the latter may be pivoted on the pins 31 to fold the same into substantially the position shown in Fig. 2 at which time the pins 53 may engage in the holes 55 formed in the U-shaped frame member 32 and the holes 58 in the sides of the guards 27 to hold the same locked in folded position.

As best illustrated in Fig. 2, the steering column 43 is considerably longer than the frame members 10 and therefore when it is desired to fold the same the steering column 43 will be moved into the recess 22 formed in the spool 18 so that the U-shaped frame member 32 and the frame members 10 will lie in substantially parallel relationship. This is of considerable advantage because the coaster can be folded when not in use and the same can be trundled along on the steering wheel and guided thereby so that the child will not have to carry the coaster unless he so desires. Also, the coaster can be shipped or stored away in much less space than would be the case if the same could not be folded into the compact position shown and described.

While I have shown and described suitable features of my invention, it will be understood by those skilled in the art that various changes in materials, method of manufacture and details of construction may be resorted to without departing from the spirit and substance of my invention the scope of which is to be measured only by the sub-joined claims.

What I claim is:

1. A coasting device comprising a frame having parallel side rails, upright pivotally supported at one end of said rails, a steering post extending therebetween, brace members pivoted to said side rails intermediate the ends thereof and engageable with said uprights for locking the same in vertical position, a guard rigidly secured to the opposite end of said rails, and means in said guard arranged to receive said post with said uprights embracing opposite sides of said guard upon pivoting thereof into position parallel with said rails, said brace members pivoting about said rails and adapted to lock said uprights to said guard.

2. A coasting device comprising a frame having two side rails, a pair of uprights pivoted to one end of said frame and conjointly movable from a position normal to said frame to a collapsed position parallel to said rails, a guard at the opposite end of said rails of a width such as to fit within said uprights in collapsed position, a pair of brace members pivoted on said rails intermediate the ends thereof and means on the ends of said members engageable with said uprights in normal position to hold the same against pivotal movement and engageable with both said uprights and guard in collapsed position to prevent relative movement therebetween.

3. A coasting device comprising a frame having two parallel side rails, a wheel pivotally mounted between said rails at one end thereof and having an annular groove in the center thereof, a guard for said wheel comprising angle members secured to said rails and extending over the top of the wheel with a space therebetween above said groove, a steering post and supporting uprights pivoted to the opposite end of said rails and movable into parallel alinement with said rails, said uprights embracing the sides of said guard and said post passing between said members to lie in the groove of said wheel, and means pivoted to said rails for locking said uprights to the sides of said guard.

4. In combination, in a coasting device, a frame comprising two laterally spaced side rails, a pair of brace members pivoted at one end to said rails intermediate the ends thereof and having pin means projecting toward each other at the opposite ends of said members, a steering assembly pivotally supported at one end of said rails and having alined openings intermediate its ends for receiving said pin means to secure said assembly in predetermined angular position relative to said frame, and means at the opposite end of said frame for receiving the free end of said assembly and having means engageable by said pin means for locking said assembly in collapsed position parallel to said frame.

5. In combination, in a coasting device, a frame including parallel side rails, a steering assembly including laterally spaced uprights pivoted to one end of said rails and having a rotatable steering post supported by and extending longitudinally therebetween and carrying a steering wheel at the lower end thereof between said uprights, a transverse axle at the opposite end of said rails, and a spool wheel thereon having a peripheral groove in the midplane thereof, said assembly being pivotally movable into a position with said uprights lying superposed on said rails and said post extending into the groove in said spool wheel.

SAM R. SMITH.